Figure 1:
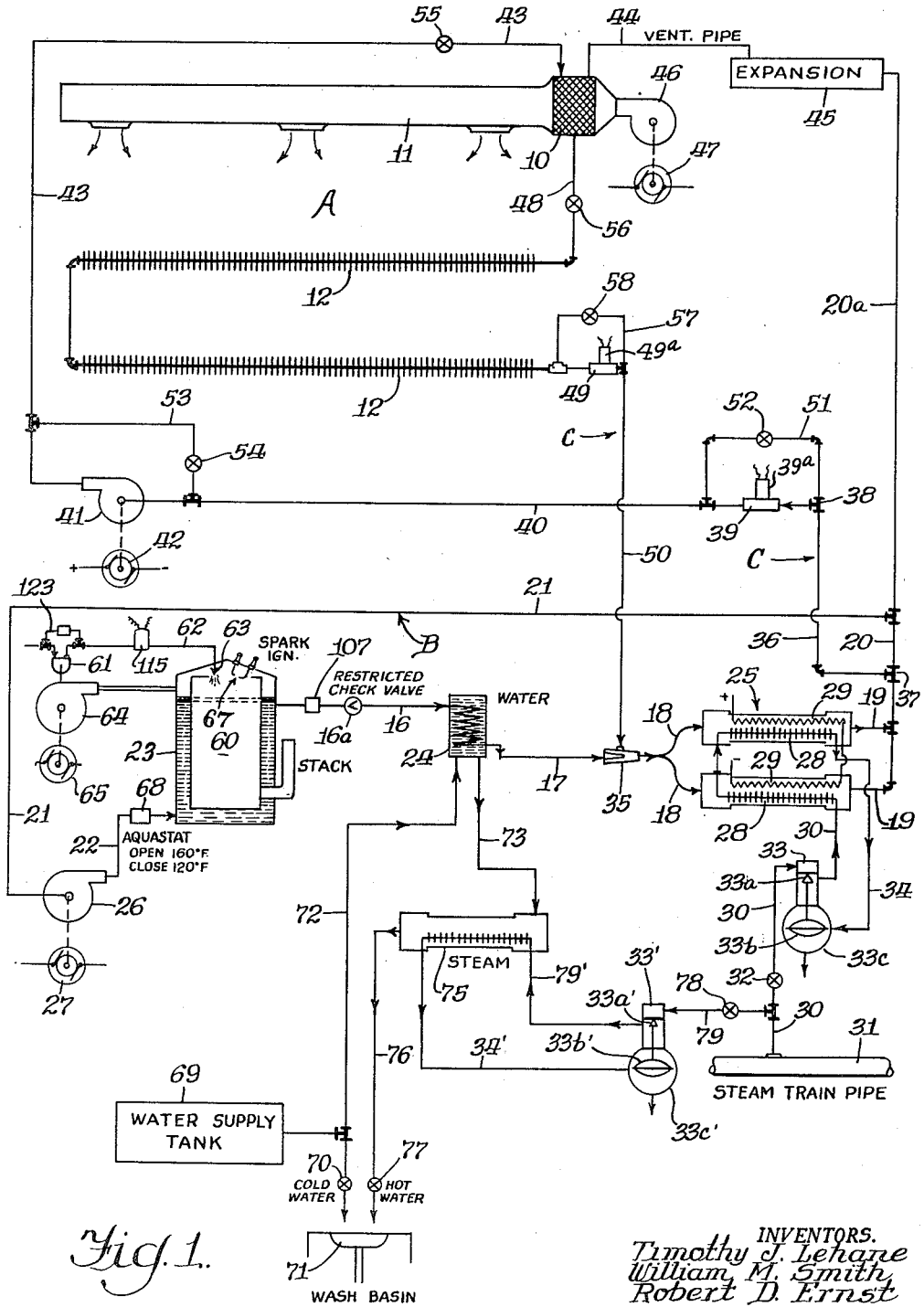

Nov. 16, 1954  T. J. LEHANE ET AL  2,694,526

SPACE HEATING SYSTEM

Filed April 5, 1951  2 Sheets-Sheet 1

INVENTORS.
Timothy J. Lehane
William M. Smith
Robert D. Ernst
By Harvey M. Gillespie
Atty

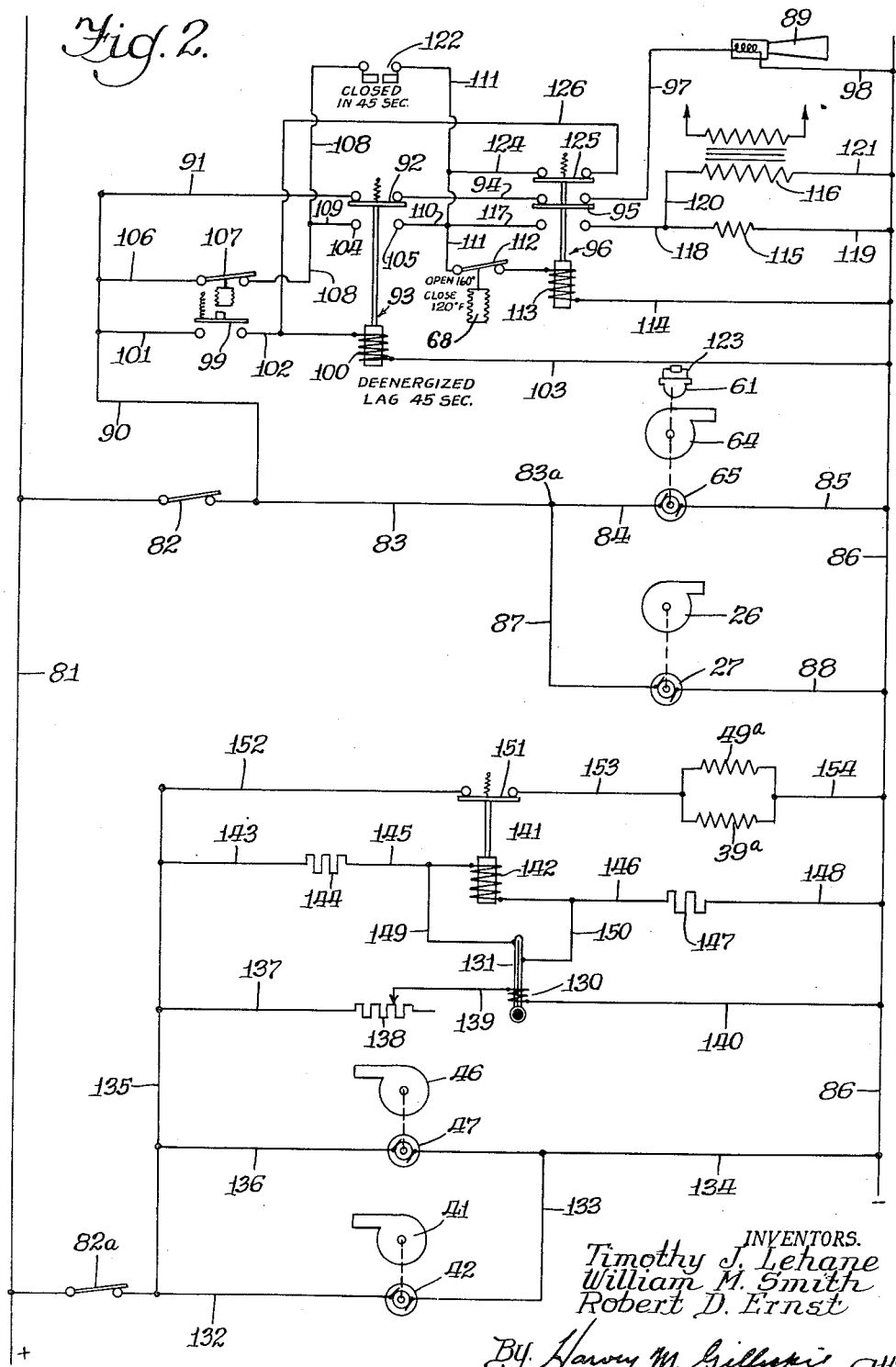

United States Patent Office 2,694,526
Patented Nov. 16, 1954

2,694,526

SPACE HEATING SYSTEM

Timothy J. Lehane, North Riverside, William M. Smith, Glen Ellyn, and Robert D. Ernst, North Riverside, Ill., assignors to Vapor Heating Corporation, Chicago, Ill., a corporation of Delaware Application April 5, 1951, Serial No. 219,484

16 Claims. (Cl. 237—5)

This invention relates to improvements in space heating systems and particularly to heating systems of this character in which a liquid is utilized as a heat carrier; the liquid being circulated through one or more devices for delivering the heat into the space being heated.

The invention is directed principally to improved arrangements and constructions whereby a circulated liquid may be heated from any one or more of a plurality of heat sources, for example a hot water boiler connected in the liquid circulating system or a heat exchanger activated electrically or by steam as a heating medium and arranged in heat exchange relation with the liquid circulated in the system. The system includes a primary circulating loop in which one or more of the several liquid heating elements are connected and a secondary loop provided with heat radiating elements from which heat is delivered into the space being heated. The primary purpose of the primary loop is to maintain the water therein at a suitable temperature and to deliver the heated water when it is required, to the secondary loop.

The activation of the boiler and other liquid heaters in the primary loop is controlled automatically so that the heating element or elements employed will function economically to heat the water in the primary loop to a desired temperature. The circulation of the heated liquid through the secondary loop for heating the enclosure is controlled by means responsive to the temperature of the enclosure.

In addition to supplying heated liquid to the secondary loop, the primary loop circulation is employed also to heat wash water delivered to wash basins, etc., if and when steam is not available for this purpose.

It is a principal object of the invention to provide a space heating system constructed and operating in accordance with the principles above set forth and which will contain the various advantages above and hereinafter described.

A further and more specific object is to provide a heating system for a railway car, the system including provisions for supplying heating medium both individually and conjointly from separate sources, whereby the heating system may be used in situations where only one or more of the alternative heat sources are available or when the external temperatures are such as to require heat from two or more sources conjointly.

Other objects and advantages will be at once apparent from the statement of invention above set forth and hereinafter described in the embodiment of the invention depicted in the accompanying drawings.

In the drawings:

Fig. 1 is a heating system constructed in accordance with our invention; the various parts of the system being shown diagrammatically for the purpose of clearness, and Fig. 2 is a wiring diagram of electrical control circuits employed to control the functioning of the liquid heating elements and for controlling the delivery of heat into an enclosed space.

The enclosed space to be heated, for example a railway car, is designated generally by the letter "A." The heating system as a whole includes two conduit loops for heating and circulating a liquid, for example water, through space heating means located in the car. One loop designated herein as the primary loop is identified as a whole by the letter "B" and is utilized to deliver heated water to a secondary loop designated "C." The latter includes space heating means including an air heater designated by the numeral 10 and functions to apply heat to a stream of air delivered into the enclosure A by means of an air duct 11 and another element 12 in the form of a radiator extending along opposite sides of the enclosure at a location adjacent the floor thereof. This radiator functions to add heat directly to the atmosphere within the enclosure A.

The primary circulating loop B comprises a high temperature or delivery side including conduit sections 16, 17, 18, 19 and 20 and a return side including conduits 21 and 22. An automatically controlled boiler 23, a water to water heat exchanger 24, and a combined electrical and steam heat exchanger 25 are connected in series relation in said high temperature or delivery side of the loop. A pump 26, driven by an automatically controlled motor 27, is connected in the return side of the loop intermediate the conduit sections 21 and 22 thereof and is adapted, when operated, to maintain forced circulation through the boiler 23, the water to water heat exchanger 24, and the combination heat exchanger 25. The said pump 26 is of a type, preferably centrifugal, which will permit thermal or otherwise induced circulation of the water to pass through the pump when the latter is not operating. A weighted check valve 16a in conduit 16 is normally fully open when the boiler 23 is operating, but is partly closed when the system is heated by means of the combination heat exchanger 25.

Water heated by steam

It will be observed from above that the water in the primary loop B may be heated either by means of the boiler 23 or by means of the steam or electrical heat exchanger 25. When steam is available, for example when a railway car equipped with the improved heating system is coupled in a passenger train, the steam heat element 28 of the heat exchanger 25 is normally used to heat the water. Likewise, if an adequate supply of electrical energy is available, as in the case of an electrically operated train or a Diesel-electric operated train, the electrical heating coil 29 is used to heat the water in heat exchanger 25. The steam is supplied through a branch 30 leading from the steam train pipe 31 through a shut-off valve 32 and an automatically controlled pressure reducing valve 33. For purpose of economy, the steam pressure within the steam heater 28 is maintained at substantially atmospheric pressure. To this end the pressure reducing valve structure 33 is thermostatically controlled in relation to the temperature at the discharge end of the steam heater 28. Accordingly, a valve element 33a of said reducing valve structure is actuated by means of a temperature responsive element 33b. A conduit 34 leading from the outlet of the steam heater 28 to the atmosphere is connected through a chamber 33c containing the thermal element 33b. Consequently, when steam is delivered to the steam heater 28 of the heat exchanger 25 in a greater amount than will be condensed therein, the surplus steam is discharged into thermostat chamber 33c and thereby causes the thermal element to expand and close the valve 33a until such time that the steam in heater 28 is fully utilized to heat the water in said heat exchanger.

When the electrical heater 29 is utilized, it is connected with the main source of electrical supply.

During the use of the heat exchanger 25 to heat the water in the primary loop B when the boiler 23 is not utilized, the hot water will discharge from the heat exchanger 25 and flow by thermal action through conduit sections 19—19 into delivery conduit 20 and thence through conduit section 21, inactive pump 26 and conduit 22 into the the boiler 23. The water is conducted by conduit 16 through the water to water heat exchanger 24 and thence through conduit 17 and a syphon nozzle fitting 35 into the receiving end of the heat exchanger 25. It will be observed, therefore, that the water in the boiler 23 and in all parts of the primary coil B is heated so as to prevent freezing during severe weather and so as to maintain the body of water in the boiler at a suitable temperature, whereby the boiler is at all times in condition for immediate service, either as a booster heater when the heat exchanger 25 is insufficient to satisfy the heating demand or as an alternative source of heat when the steam is no longer available—for example, when the car being heated is disconnected from the main train or, as frequently happens, is coupled in a train composed of freight cars which are not provided with a steam train pipe.

Secondary or space heating loop

The secondary loop C, as previously indicated, circulates the hot water through the space heating elements 10 and 12. The air heater 10 constitutes the principal space heater. Consequently the space heaters 10 and 12 are connected in series relationship so that the hot water will first pass through the air heater 10 and then through the floor radiators 12—12. The normal flow path of the water includes a supply branch 36 which leads to fitting 37, interposed in the delivery pipe 20 and then thence to a fitting 38 and through a normally open solenoid closed supply valve 39 and conduit 40 to a centrifugal pump 41, the latter of which is operated by an automatically controlled motor 42. The pump 41 draws the hot water from the primary loop B and delivers it through conduit 43 to the air heater 10. Inasmuch as the heater 10 is normally located at a high part of the system it is connected by a vent pipe 44 to an expansion tank 45; the tank being also connected by branch pipe 20ᵃ to the main delivery pipe 20. A blower 46, operated by an electric motor 47, blows air through the heating element 10 in sufficient volume to extract a major portion of heat from the water; the heated air being passed through the air duct 11 into the enclosure A of the car. The partially cooled water continues its movement through conduit 48 to the floor heaters 12—12 and returns through normally open solenoid closed valve 49 and return conduit 50 to the syphon fitting 35 located in the delivery side of the primary loop. At this location the returned water is mixed with hot water circulated through boiler 23 and is passed through branch conduits 18—18 to the heat exchanger 25 to be reheated.

The operation of the pump 41 in withdrawing water from the delivery pipe 20, together with the movement of the return water from conduit 50 through the syphon fitting, serves to accelerate the circulation of water through the boiler 23 and other portions of the primary loop B. This acceleration of the flow of water through the primary loop B is particularly advantageous when the pump 26 is inactive.

A by-pass 51 normally closed by a valve 52 connects the flow path of hot water around the solenoid valve 39 so that the system will remain operable in the event that valve 39 should fail in service. A similar by-pass 53 containing a normally closed valve 54 connects the flow path of the hot water around the pump 41 and a like by-pass 57 and 58 provides a connection around the solenoid valve 49. Shut-off valves 55 and 56 are interposed in the pipe branches 43 and 48.

Boiler as source of heat

When the boiler 23 is used as a source of heat, either idependently or conjointly with the use of steam and heat exchanger 25, fuel and combustion air are delivered to the combustion chamber 60 of the boiler 23. The fuel, for example fuel oil, is delivered by a pump 61 through a fuel pipe 62 to a fuel nozzle 63 for atomizing the oil. The combustion air is delivered by a blower 64. In order to insure introduction of a predetermined proportion of fuel and air, the fuel pump 61 and the blower are operated by the same motor 65.

In order to insure forced circulation of water through the boiler when the boiler is supplied with fuel, the motor 65 for operating the fuel pump and the blower and the motor 27 for operating the boiler circulation pump 26 are connected in parallel in a common circuit. A solenoid valve 115 is interposed in the fuel oil pipe 62 and is electrically connected in parallel with the ignition circuit in a common circuit so as to control the delivery of oil with the energization of the spark plug 67. The last mentioned common circuit is controlled by an Aquastat 68 connected in the water conduit 22 leading into the boiler 23, and set to shut off the supply of fuel and air to the boiler when the water returned to the boiler reaches a predetermined maximum, for example 160° F. However, under this condition the pump 41, for circulating the water through the space heaters 10 and 12, and the blower 46, for forcing air through air heater 10, may continue their operation to supply heat to the space A. When the temperature of the water being returned to the boiler 23 falls below its prescribed minimum temperature, for example 120° F., the Aquastat 68 will function to reenergize the motors 65 and 27 so that the supply of fuel and air to the boiler and the forced circulation of water through the boiler will be resumed.

Wash water

The hot water from the boiler 23 flows through the water to water heat exchanger 24 and thereby heats a supply of wash water. The water flows from a cold water supply tank 69 to the cold water tap 70 associated with wash basin 71 and also flows through pipe 72 to the water to water heat exchanger 24 and thence through pipe 73 of a steam and water heat exchanger 75, and pipe 76 to a hot water tap 77 associated with the wash basin 71.

When steam is available it may be used to heat the wash water by directing steam from the steam train pipe 31 into the heat exchanger 75. This is accomplished by opening valve 78 interposed in branch steam pipe 79. The steam passes through a steam pressure reducing valve 33'. This pressure reducing valve is identical in structure with that of the valve 33. Consequently the valve is identified by the same reference characters with a primed exponent. It will be seen, therefore, that the steam pressure in heat exchanger 75 is maintained at substantially atmospheric pressure in the same manner as described, heretofore, in connection with heat exchanger 25.

Electrical control circuits

Referring now to the electrical system shown in Fig. 2 for controlling the circulation of the water through the space heaters 10 and 12 and for also controlling the operation of the boiler: The main switch includes two switch arms 82 and 82ᵃ, the former sets up the circuits for controlling the boiler 23 and the latter sets up the circuits for controlling the circulation through the space heating loop C. The closing of said switch 82 energizes a circuit through the water pump motor 27 so as to accelerate the circulation of water through the boiler. It also closes an energizing circuit through the motor 65 for operating the combustion air blower 64 and the fuel pump 61 so as to initiate the delivery of combustion air and fuel to the fire chamber 60 of the boiler 23. The blower and boiler circulation pump actuating circuits lead from positive line 81 through switch 82 and conductor 83 to a junction 83ᵃ. At this point one branch of the circuit follows through conductor 87 through the boiler circulation pump motor 27 and conductor 88 to the negative line 86. Another branch leads from said junction 83ᵃ through conductor 84, blower and boiler circulation pump motor 27 and conductor 85 to the negative line 86. The closing of switch 82, in addition to energizing the blower and pump motors 65—27, energizes a signal circuit through an electrical horn 89. This circuit leads from switch 82 and conductor 83 through a bus conductor 90, branch conductor 91, the deenergized closed contact 92 of out-fire relay 93, conductor 94, deenergized closed contact 95 of ignition relay 96, thence through wire 97, horn 89 and wire 98 to the negative line 86. The said signal circuit is broken immediately upon closing the starting push button 99, since the circuit closed by the push button 99 energizes the solenoid winding 100 of the out-fire relay 93 so as to open its contact 92. This relay energizing circuit leads from the bus conductor 90 through wire 101, closed push button 99, wire 102, winding 100 of relay 93 and wire 103 to the negative line 86. The winding 100 of relay 93 is constructed to hold the relay energized for forty-five seconds after the energizing circuit is broken by the release of the push button 99. So long as the out-fire relay 93 is energized its contact 92 closes contacts 104—105 to close an energizing circuit through the winding of relay 96. This circuit leads from the bus conductor 90 through wire 106, normally closed Aquastat switch 107, wires 108 and 109 through contacts 104—105 of relay 93, wires 110 and 111, Aquastat low temperature switch 112, winding 113 of relay 96 and wire 114 to the negative line 86. The energization of relay 96 moves its contact 95 into position to close the circuit through the fuel solenoid valve 115 and simultaneously establishes a circuit through the primary winding 116 of a transformer for supplying high tension current to the spark plugs 67. The circuit through the solenoid valve 115 leads from the positive line 81, main switch arm 82, bus conductor 90, branch conductor 106, temperature limit switch 107, wires 108—109, contacts 104—105 of relay 93, wires 110, 117 to the energized closed contact 95 of relay 96, wire 118, solenoid valve winding 115 and wire 119 to the negative line 86. The primary winding of said transformer is in a branch circuit leading from wire 118 through wire 120, transformer winding 116 and wire 121 to the negative line 86. The boiler circulation pump 26, combustion air blower 64, fuel pump 61 and the fuel delivering and ignition elements of the circuit will remain operative for a period of forty-five seconds, since the said relay 93 will retain its energized closed position for that period of time. If the fire starts in the boiler, a stack switch 122 will normally close within forty-five seconds and, therefore, establish a holding circuit to maintain the relay 96 energized after the relay 93 has become de-energized and returned to the position indicated in Fig. 2. The stack switch circuit connects the conductors 108, 111 and 117. Consequently, the boiler will function until the switch 112 of Aquastat 68 opens in response to the maximum temperature limit of the water returning to the boiler. Consequently, the boiler will function without further attention to deliver water into loop B at a temperature below the temperature setting of the switch 107, for example 200° F. However, if the heating conditions within space A do not require the full heat output of the boiler 23 the water returning to the boiler will be relatively hot. If this temperature is at the upper limit of the temperature range for the return water, for example 160° F., the Aquastat switch 112 will open and thereby de-energize relay 96 so as to de-energize and thereby close the fuel valve 115. However, the boiler circulation pump 26, blower 64, and oil pump 61 continue to operate, there being a pressure opened by-pass 123 from inlet to the outlet of the oil pump so as to avoid excessive pressure at the delivery side of the pump. The stack switch 122 will normally remain closed for a substantial time period after the switch 112 opens. Consequently the out-fire relay 93 will be energized, by a holding circuit, so as to prevent energizing the signal horn. The said holding circuit leads from closed switch 107, wire 108, stack switch 122, wires 111, 124, de-energized closed contact 125 of relay 96, wires 126 and 102 through winding 100 of relay 93 and thence through wire 103 to the negative line. If and when the temperature of the water returning to the boiler falls to 120° F. while the stack switch 122 remains closed, the Aquastat switch 112 will close and the firing operation of the boiler will be resumed.

The temperature limit switch 107 will open to shut down the boiler if the temperature of the delivery water becomes objectionably high. When switch 107 opens, the signal horn is energized and the boiler will not thereafter resume operation automatically. In such instance the boiler can resume its operation only by manual closing of the push button 99.

*Space heat control*

Referring now to the control circuits which are effective to control the circulation of hot water through the space heaters 10 and 12 regardless of what heat source is utilized to heat the water: When heating is required in the space A, an attendant will close the main switch 82ª and thereby simultaneously close energizing circuits through the motors 42 and 47 for operating the circulating pump 41 and blower 46, respectively, and through an auxiliary heater 130 of a thermostat 131, the latter of which is set to function at a predetermined temperature of the space A. The circuit through the circulating pump motor 42 leads from the main switch 82ª through wire 132, motor 42 and wires 133 and 134 to the negative line 86. The circuit through the blower motor 47 leads from the switch 82ª and wire 132 through a bus conductor 135, wire 136, motor 47 and wire 134 to the negative line. The circuit through the auxiliary heater 130 leads from the bus conductor 135 through wire 137, variable resistor 138, wires 139, heat winding 130 and wire 140 to the negative line 86. The variable resistor 138 provides means whereby more or less heating current can be supplied to the auxiliary heater 130 and thereby raise or lower the temperature setting of thermostat 131. A valve control relay 141 provided with solenoid winding 142 is connected in a circuit leading from the bus conductor 135 through wire 143, resistor 144, wire 145, winding 142, wire 146, resistor 147 and wire 148 to the negative line 86. Consequently, the closing of main switch 82ª will energize and thereby open the relay 141 provided that the mercury column of thermostat 131 is out of contact with its upper contact. The upper and lower contacts of the said thermostat 131 are connected in a shunt circuit composed of wires 149 and 150 connected in the wires 145 and 146 at opposite sides of the relay winding 142. Consequently, when the thermostat 131 is closed the electrical current is shunted around the solenoid winding 142 and thereby de-energizes the relay 141 to close its contact 151. The closing of the contact 151 closes an energizing circuit through both solenoids 39ª, 49ª of valves 39 and 49 for controlling the circulation of water through the space heaters 10 and 12. The solenoid valves 39 and 49, as previously indicated, are normally open and are energized closed. Consequently, when the thermostat 131 is closed, as indicated in Fig. 2, the solenoids 39ª, 49ª are energized and the valves 39, 49 are closed. The circuit for energizing said solenoid valves leads from the bus conductor 135 through lead 152, de-energized closed contact 151 of relay 141, lead 153, the windings of both valves 39 and 49 and thence through lead 154 to the negative line 86.

From the above description, it will be seen that we have provided an improved heating system in which water or other heated liquid is circulated through the space heating elements within the space A to maintain a predetermined temperature within the space. The circulated liquid may be heated by one or more of a plurality of heat sources. When the liquid is heated by means of steam the supply of steam to the heat exchanger 25 is automatically controlled in such manner that when the return water to the heat exchanger is such as not to utilize the steam delivered to the exchanger, the steam discharged from the heat exchanger will bring about the closing of the steam supply valve and thereby function to prevent overheating of the liquid delivered to the space heaters. It will be observed also that when the circulated liquid is heated by means of the automatically controlled boiler, the firing of the boiler is automatically shut off when the temperature of the return water reaches a predetermined maximum, but the boiler will automatically resume its operation when the temperature of the return water cools to the lower limit of a predetermined temperature range. However, if for any reason the water delivered by the boiler should reach an objectionally high temperature, the boiler is shut off and operations thereof will not be automatically resumed.

We claim:

1. A space heating system comprising a closed conduit primary loop for maintaining continuous circulation of a quantity of heated water therethrough, a water heater connected in and dividing said loop into a hot water delivery side and a water return side, means for delivering heat into the said space comprising a secondary loop having a water receiving end connected into the hot water delivery side of the primary loop and a water discharge end connected into the delivery side of the primary loop at a location intermediate said water heater and the inlet end of the secondary loop, a pump interposed in the secondary loop for creating forced circulation therethrough, and a syphon nozzle interposed in the delivery side of the primary loop at its junction with the discharge end of said secondary loop.

2. A space heating system comprising a closed conduit primary loop for maintaining continuous circulation of a quantity of heated water therethrough and including a hot water delivery side and a water return side, a plurality of cooperatively operable water heaters connected in said hot water delivery side of the primary loop, means for delivering heat into the said space comprising a secondary loop having a water receiving end connected into the hot water delivery side of the primary loop and a water discharge end connected into the delivery side of the primary loop at a location intermediate one of said water heaters and the receiving end of the secondary loop, a pump interposed in the secondary loop for creating forced circulation therethrough, and a syphon nozzle interposed in the primary loop at the junction thereof with the discharge end of the secondary loop, whereby the water forcibly discharging from the secondary loop stimulates circulation in the primary loop.

3. A space heating system comprising a closed conduit primary loop for maintaining continuous circulation of a quantity of heated water therethrough and including a hot water delivery side and a water return side, a plurality of cooperatively operable water heaters connected in said hot water delivery side of the primary loop, means for delivering heat into the said space comprising a secondary loop having a water receiving end connected into the hot water delivery side of the primary loop and a water discharge end connected into the delivery side of the primary loop at a location intermediate one of said water heaters and the receiving end of the secondary loop, a pump interposed in the secondary loop for creating forced circulation therethrough, and a syphon nozzle interposed in the primary loop at a location intermediate said water heaters at the junction thereof with the discharge end of the secondary loop, whereby the water forcibly discharging from the secondary loop stimulates circulation through all water heaters in the primary loop.

4. A space heating system comprising a closed conduit primary loop for maintaining continuous circulation of a quantity of heated water therethrough and including a hot water delivery side and a water return side, a plurality of cooperatively operable water heaters connected in said hot water delivery side of the primary loop, means for delivering heat into the said space comprising a secondary loop having a water receiving end connected into the hot water delivery side of the primary loop and a water discharge end connected into the delivery side of the primary loop at a location intermediate one of said water heaters and the receiving end of the secondary loop, a plurality of heat radiating elements connected in series relation in the secondary loop, a pump interposed in the secondary loop for creating forced circulation therethrough, and a syphon nozzle interposed in the primary loop at the junction thereof with the discharge end of the secondary loop, whereby the water forcibly discharging from the secondary loop stimulates circulation in the primary loop.

5. A space heating system comprising a closed conduit primary loop for maintaining continuous circulation of a quantity of heated water therethrough and including a hot water delivery side and a water return side, a plurality of cooperatively operable water heaters connected in said hot water delivery side of the primary loop, means for delivering heat into the said space comprising a secondary loop having a water receiving end connected into the hot water delivery side of the primary loop and a water discharge end connected into the delivery side of the primary loop at a location intermediate one of said water heaters and the receiving end of the secondary loop, a pump interposed in the secondary loop for creating forced circulation therethrough, means including a blower and an air duct for delivering air into the said space, a heat exchanger connected in the secondary loop for heating said air, and means for utilizing the forcible discharge of water from the secondary loop for stimulating circulation in the primary loop comprising a syphon nozzle connected in the primary loop at the discharge end of the secondary loop.

6. A space heating system comprising a closed conduit primary loop for maintaining continuous circulation of a quantity of heated water therethrough and including a hot water delivery side and a water return side, a plurality of cooperatively operable water heaters connected in said hot water delivery side of the primary loop, means for delivering heat into the said space comprising a secondary loop having a water receiving end connected into the hot water delivery side of the primary loop and a water discharge end connected into the delivery side of the primary loop at a location intermediate one of said water heaters and the receiving end of the secondary loop, a pump interposed in the secondary loop for creating forced circulation therethrough, means including a blower and an air duct for delivering air into the said space, a heat exchanger connected in the secondary loop for heating said air, a heat radiator connected in the secondary loop and arranged within the space being heated, and means for utilizing the forcible discharge of water from the secondary loop for stimulating circulation in the primary loop comprising a syphon nozzle connected in the primary loop at the discharge end of the secondary loop.

7. A space heating system comprising a closed conduit primary loop for maintaining continuous circulation of a quantity of heated water therethrough and including a hot water delivery side and a water return side, a plurality of cooperatively operable water heaters connected in said hot water delivery side of the primary loop, means for delivering heat into the said space comprising a secondary loop having a water receiving end connected into the hot water delivery side of the primary loop and a water discharge end connected into the delivery side of the primary loop at a location intermediate one of said water heaters and the receiving end of the secondary loop, a pump interposed in the secondary loop for creating forced circulation therethrough, means including a blower and an air duct for delivering air into the said space, a heat exchanger connected in the secondary loop for heating said air, a heat radiator connected in the secondary loop and arranged within the space being heated, means for utilizing the forcible discharge of water from the secondary loop for stimulating circulation in the primary loop comprising a syphon nozzle connected in the hot water delivery side of the primary loop at the discharge end of the secondary loop, and means for automatically controlling the circulation of water through the secondary loop comprising an electrically closed admission valve connected in the receiving end portion of the loop, and a thermostat, responsive to the temperatures within said space, for controlling the closing and opening of said valve.

8. A space heating system comprising a primary conduit loop including a hot water delivery side and a water return side, a plurality of cooperatively operable water heaters connected in series in said hot water delivery side of said primary loop, which heaters include a steam activated heat exchanger and a fuel fired hot water boiler, means including a thermally actuated valve for controlling the delivery of steam to said heat exchanger, and means including thermally responsive control devices for automatically controlling the operations of said boiler in relation to the water temperature, means for delivering heat into said space comprising a secondary loop having a receiving end connected into the hot water delivery side of said primary loop and a discharge end connected into the hot water delivery side of primary loop at a location intermediate said steam activated heat exchanger and said hot water boiler, and an electrically operated boiler circulation pump connected in the primary loop at the inlet side of the said boiler for creating forced circulation of water through the primary loop.

9. A space heating system comprising a primary conduit loop including a hot water delivery side and a water return side, a plurality of cooperatively operable water heaters connected in series in said hot water delivery side of the primary loop, which heaters include a steam activated heat exchanger and a fuel fired hot water boiler, means including a thermally actuated valve for controlling the delivery of steam to said heat exchanger, and means including thermally responsive control devices for automatically controlling the operations of said boiler in relation to the water temperature, means for delivering heat into said space comprising a secondary loop having a receiving end connected into the hot water delivery side of said primary loop intermediate the said water heaters and the return side of the primary loop and a discharge end connected into said hot water delivery side of the primary loop at a location intermediate said steam activated heat exchanger and said hot water boiler, a circulating pump connected in the secondary loop for forcibly circulating the water therethrough, and an electrically operated boiler circulation pump connected in the primary loop at the inlet side of the said boiler for creating forced circulation of water through the primary loop and cooperating with the first mentioned pump for maintaining said forced circulation in the secondary loop.

10. A space heating system as defined in claim 9 characterized in that the boiler circulation pump is of a construction which will permit passage of water therethrough when the pump is not operating.

11. A space heating system as defined in claim 10 characterized in that the portion of the primary loop connected with the outlet of the boiler includes a valve adapted to open when the boiler circulation pump is operating and to partially close when the boiler circulation pump is not operating.

12. A space heating system as defined in claim 9 characterized in that an electrically actuated valve is provided for controlling the delivery of oil as a fuel to the boiler, which valve is connected in parallel with an ignition means so as to deliver oil to the boiler simultaneously with the energization of said ignition means, and is further characterized by the provision of a momentarily energized relay and a second relay controlled thereby for momentarily energizing said fuel valve and said ignition means.

13. A space heating system as defined in claim 12 characterized by means defining an electrical circuit including a thermally closed stack switch and adapted when closed to prolong the energization of said momentarily energized relay.

14. A space heating system as defined in claim 13 characterized by the provision of a thermal switch interposed in the energizing circuit of the second relay and responsive to a predetermined temperature to open said relay circuit and effect deenergization of the fuel valve and the ignition means so as to stop firing operations of the boiler and responsive to a predetermined lower temperature to re-energize the second relay and thereby energize the fuel valve and ignition means to resume operation of the boiler.

15. A space heating system as defined in claim 14 characterized by the provision of a signal circuit which is closed when both said relays are deenergized during the operation of the system.

16. A space heating system as defined in claim 15 characterized by the provision of a thermal switch responsive to a predetermined maximum temperature at the outlet of said boiler and adapted to open an existing energizing circuit through both of the relays.

References Cited in the file of this patent

UNITED STATES PATENTS

| Number | Name | Date |
|---|---|---|
| 1,737,075 | Brandt | Nov. 26, 1929 |
| 2,005,852 | Broderick | June 25, 1935 |
| 2,081,831 | Moore | May 25, 1937 |
| 2,240,731 | Van Vulpen | May 6, 1941 |
| 2,290,347 | Moore et al. | July 21, 1942 |
| 2,332,149 | Horton | Oct. 19, 1943 |
| 2,345,277 | McGrath | Mar. 28, 1944 |
| 2,373,731 | Wilson et al. | Apr. 17, 1945 |

FOREIGN PATENTS

| Number | Country | Date |
|---|---|---|
| 809,112 | France | Dec. 3, 1936 |